(12) United States Patent
Sinharoy

(10) Patent No.: US 6,823,446 B1
(45) Date of Patent: Nov. 23, 2004

(54) APPARATUS AND METHOD FOR PERFORMING BRANCH PREDICTIONS USING DUAL BRANCH HISTORY TABLES AND FOR UPDATING SUCH BRANCH HISTORY TABLES

(75) Inventor: Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,154

(22) Filed: Apr. 13, 2000

(51) Int. Cl.[7] .............................................. G06F 9/00
(52) U.S. Cl. ...................................................... 712/239
(58) Field of Search ................................ 712/233, 234, 712/238, 239, 240

(56) References Cited

U.S. PATENT DOCUMENTS

| | | | | |
|---|---|---|---|---|
| 5,142,634 A | | 8/1992 | Fite et al. ................. | 395/375 |
| 5,367,703 A | | 11/1994 | Levitan ..................... | 395/800 |
| 5,553,253 A | | 9/1996 | Pan et al. .................. | 395/375 |
| 5,564,118 A | | 10/1996 | Steely, Jr. et al. ......... | 395/375 |
| 5,687,360 A | * | 11/1997 | Chang ....................... | 712/240 |
| 5,758,142 A | * | 5/1998 | McFarling et al. .......... | 712/239 |
| 5,794,028 A | | 8/1998 | Tran ......................... | 395/587 |
| 5,805,878 A | | 9/1998 | Rahman et al. ............. | 395/586 |
| 5,875,325 A | | 2/1999 | Talcott ...................... | 395/587 |
| 5,926,634 A | * | 7/1999 | Isaman ....................... | 712/239 |
| 5,964,869 A | | 10/1999 | Talcott et al. .............. | 712/236 |
| 6,092,187 A | * | 7/2000 | Killian ...................... | 712/239 |
| 6,189,091 B1 | * | 2/2001 | Col et al. .................. | 712/240 |
| 6,247,121 B1 | * | 6/2001 | Akkary et al. .............. | 712/239 |
| 6,272,624 B1 | | 8/2001 | Giacalone et al. .......... | 712/239 |
| 6,289,441 B1 | | 9/2001 | Talcott et al. .............. | 712/239 |
| 6,332,189 B1 | * | 12/2001 | Baweja et al. ............. | 712/238 |
| 6,374,349 B1 | * | 4/2002 | McFarling ................... | 712/239 |
| 6,640,298 B1 | * | 10/2003 | Totsuka et al. ............. | 712/239 |

OTHER PUBLICATIONS

Hennessy and Patterson, "Computer Architecture—A Quantitative Approach, 2nd Edition," 1996, p. 275.*

McFarling, "Combining Branch Predictors," WRL Technical Note TN-36, Digital Western Research Laboratory, Jun. 1993, pp. 1–25.*

* cited by examiner

Primary Examiner—Richard L. Ellis
Assistant Examiner—David J. Huisman
(74) Attorney, Agent, or Firm—Winstead Sechrest & Minick P.C.; Mark E. McBurney

(57) ABSTRACT

A branch prediction method includes the step of retrieving prediction values from a local branch history table and a global branch history table. A branch prediction operation is selectively performed using the value retrieved from the local branch history table when the value from the local branch history table falls within first predicted limits. A branch prediction operation is selectively performed using the value retrieved from the global branch history table when the value from the global branch history falls within a second predetermined limit.

5 Claims, 15 Drawing Sheets

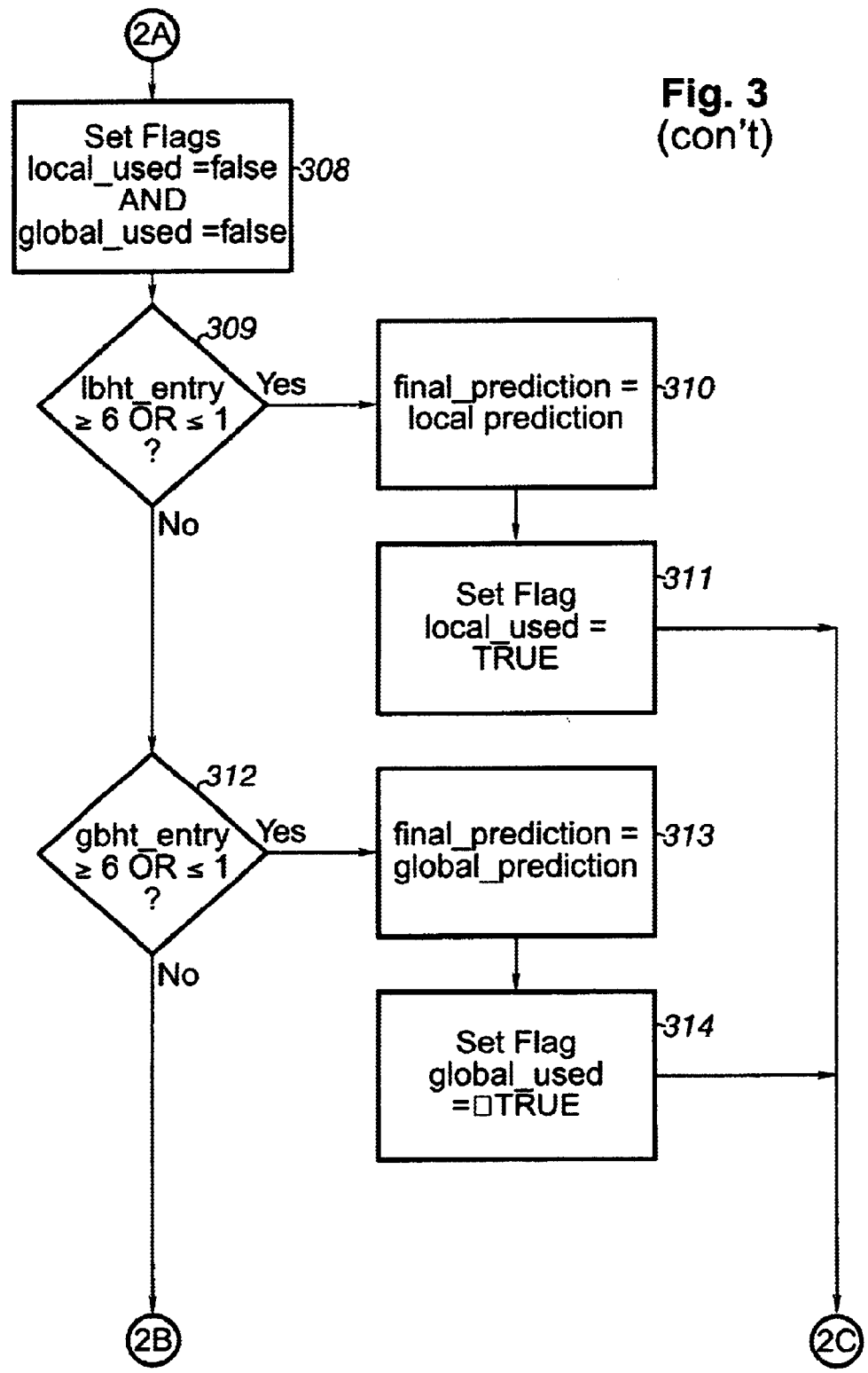

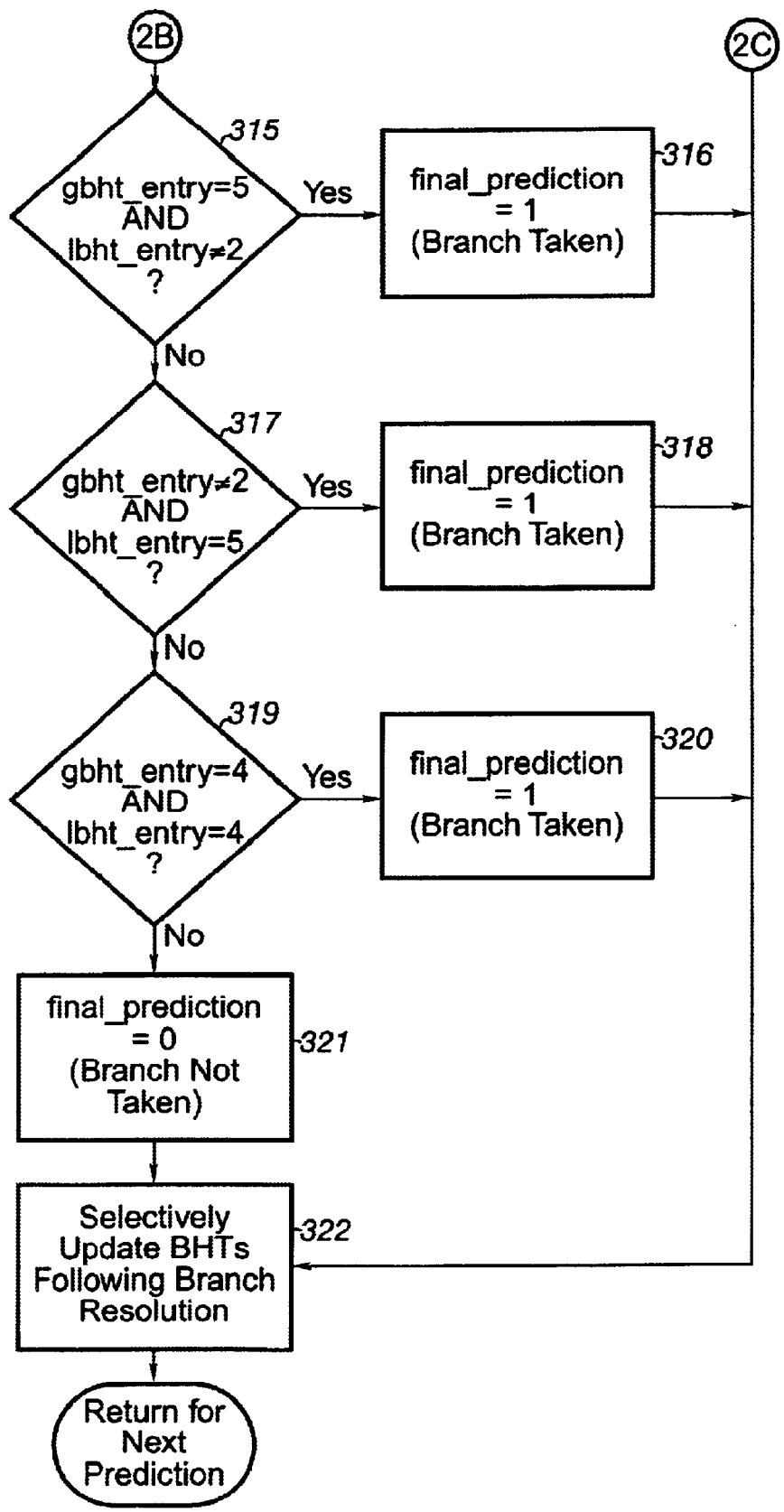
Fig. 3 (con't)

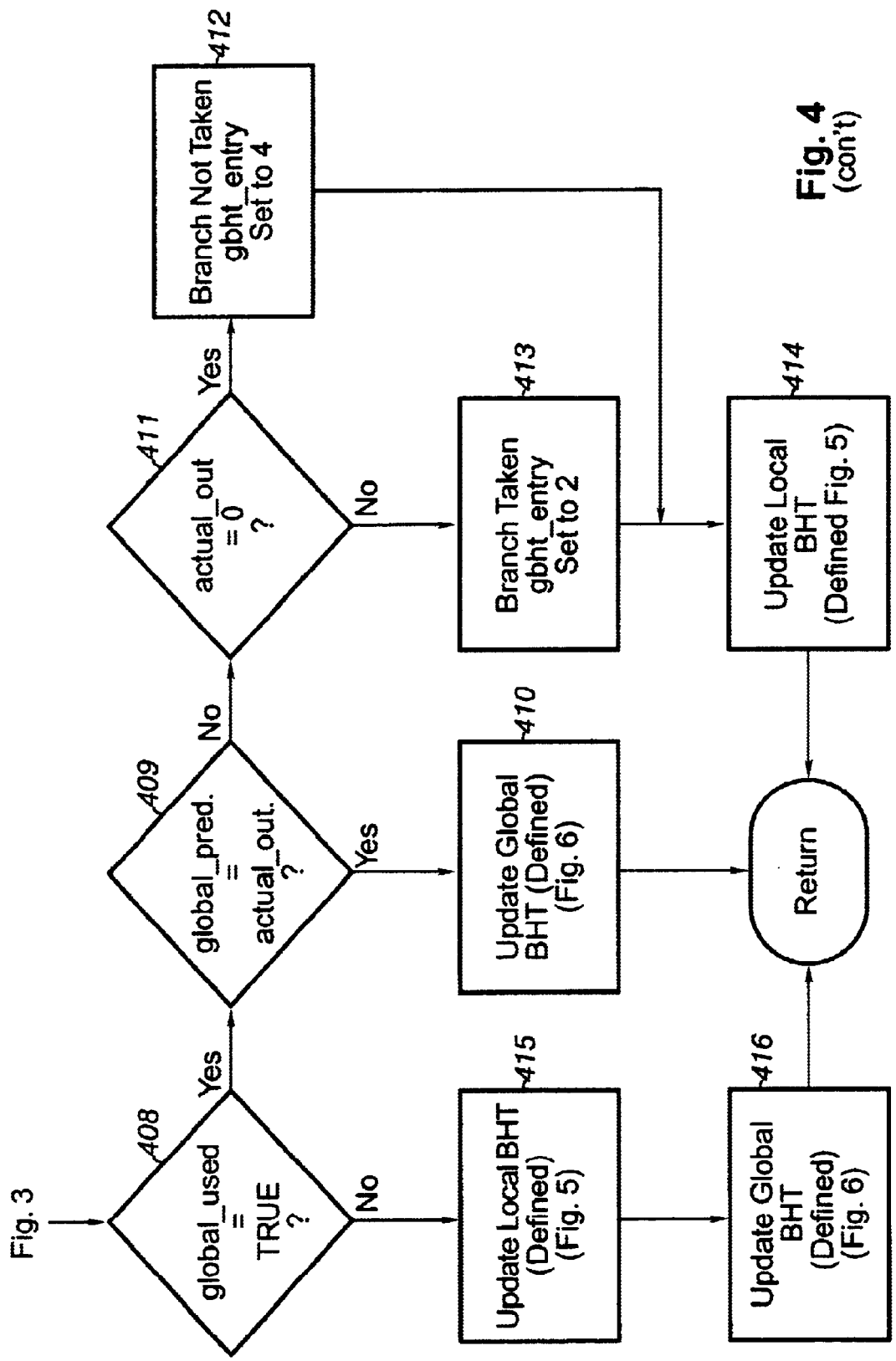
Fig. 4 (con't)

(con't)

APPARATUS AND METHOD FOR PERFORMING BRANCH PREDICTIONS USING DUAL BRANCH HISTORY TABLES AND FOR UPDATING SUCH BRANCH HISTORY TABLES

CROSS-REFERENCE TO RELATED APPLICATIONS

The present invention is related to the following commonly owned, co-pending U.S. Patent Applications hereby incorporated herein by reference:

Ser. No. 09/434,856 entitled "Apparatus and Method for Controlling Link Stack Corruption During Speculative Instruction Branching";

Ser. No. 09/434,763 entitled "Apparatus and Method for Accessing a Memory Device During Speculative Instruction Branching"; and Ser. No. 09/435,070 entitled "Circuits, Systems and Methods for Performing Branch Predictions by Selectively Accessing Bimodal and Fetch-Based Branch History Tables."

TECHNICAL FIELD

The present invention relates generally to instruction pipelining in processing systems, and in particular to apparatus and method for performing branch predictions using dual global branch history tables and for updating such global branch history tables.

BACKGROUND INFORMATION

Modern high frequency microprocessors are typically deeply pipelined devices. For efficient instruction execution in the pipelined machines, instructions are fetched and executed speculatively. In other words, a prediction is made about the direction and target of the branch instructions being fetched many cycles before the branch actually gets executed. When the branch is executed, the direction and the target of the branch is determined. If it is determined that the branch has been mispredicted (either its target or its direction), then the branch instruction is completed and all successive instructions are flushed out of the instruction pipeline and new instructions are fetched either from the sequential path of the branch (if the branch is resolved as not taken) or from the target path of the branch (if the branch is resolved as taken).

Many branch prediction techniques have been developed. For example, in Bimodal Branch Prediction, selected bits from a branch address are used as a pointer to a global branch history table. The entries to this table maintain the most recent behavior of a branch based on the number of times a corresponding branch instruction is actually taken versus the number of times that branch instruction is actually not taken. This past behavior of the branch is used to make a prediction of its behavior (taken or not-taken) when the branch instruction is fetched. If the prediction is "taken", the instructions following the branch are fetched from the target of the branch and forwarded into the instruction pipeline for their execution. Otherwise, the instructions following the branch are fetched from the next sequential address.

Often the outcome of a branch instruction (i.e., "taken" or "not-taken") correlates with the path of execution (through earlier instructions) to reach the branch instruction. So "remembering" the path to reach the branch instruction can be used to make a prediction for such branch instructions.

Therefore, in these schemes, a global history register is used which stores history bits (i.e., taken or not-taken information) for a given number of previously executed branch instructions. The history bits tag if the corresponding branch was taken or not taken. In the Gshare prediction scheme, an XOR operation is performed between the global history shift register and selected bits from the address of the branch instruction to obtain the entry number in the global history table. This entry in the global history table represents the saturating counter used to make the prediction for the branch instruction. There are several variations of the scheme on how the global history shift register is combined with the address of the branch instruction to obtain the entry number in the global history table.

Each of the existing schemes is subject to disadvantages, either in prediction accuracy, amount of hardware (e.g. the number of arrays required for the tables), or speed. Thus, the need has arisen for more efficient methods circuits and methods for performing branch prediction.

SUMMARY OF THE INVENTION

According to the principles of the present invention, a branch prediction method and apparatus are disclosed. Prediction values are retrieved from local and global branch history tables. A branch operation is selectively predicted using the value from the local branch history table when the value from the local branch history table falls within first predetermined limits. A branch prediction operation is selectively performed using the value from the global branch history table when the value from the global branch history table falls within a second predetermined limit.

In a preferred embodiment, the local branch history table is a bimodal table and the global branch history table is a global branch history table. If the value from the bimodal table shows a strong prediction direction, either branch taken or not taken, then that strong prediction is used to either fetch from the target address of the branch instruction or from the next sequential address from the branch instruction, respectively. If at branch resolution the prediction is correct, then the bimodal table alone is updated and the global prediction table is left unperturbed. Otherwise, if the bimodal table does not show a strong prediction, then the value from the global branch history table is referenced. If the global branch history table indicates a strong direction, either branch taken or branch not taken, respectively, then the global prediction is used to determine whether to fetch instructions following the branch instruction (when the prediction is "taken") or from the next sequential address of the branch instruction (when the prediction is "not taken"). If neither the bimodal table nor the global branch history table show a strong direction, the stronger of the two predictions from the bimodal and global branch history tables is taken. In this case, both the bimodal and global branch history tables are updated.

The principles of the present invention have substantial advantages over the prior art. Among other things, only two tables are required, instead of the three or four tables required to produce similar prediction accuracy in the prior art. Moreover, these principles can be implemented using a minimal amount of relatively uncomplicated logic circuitry.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
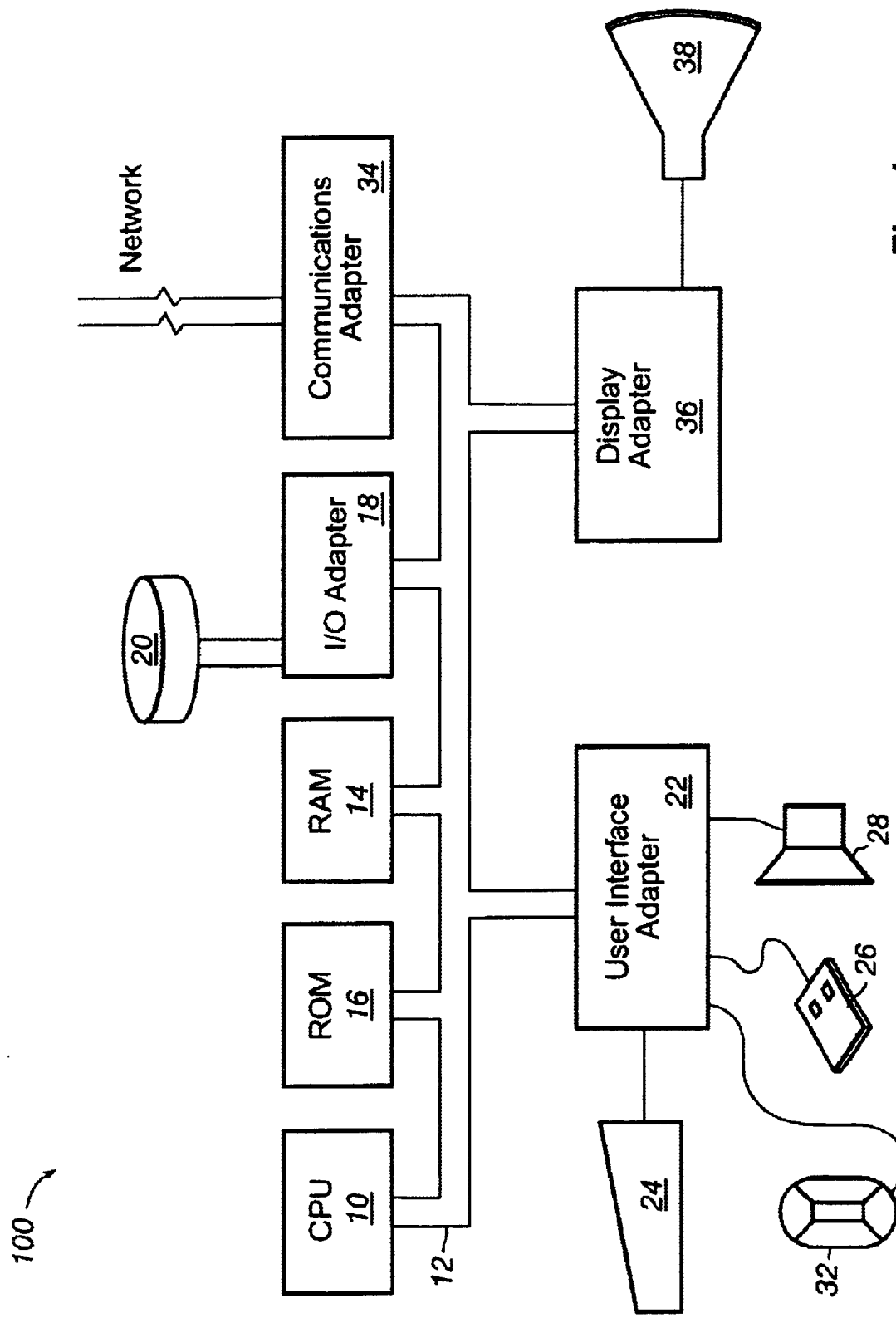
FIG. 1 is a high level functional block diagram of a representative data processing system suitable for practicing the principles of the present invention.

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

All such variations are intended to be included within the scope of the present invention. It will be recognized that, in the drawings, only those signal lines and processor blocks necessary for the operation of the present invention are shown.

Referring to the drawings, depicted elements are not necessarily shown to scale, and like or similar elements are designated by the same reference numeral through the several views.

FIG. 1 is a high level functional block diagram of a representative data processing system 100 suitable for practicing the principles of the present invention. Processing system 100, includes a central processing system (CPU) 10 operating in conjunction with a system bus 12. CPU 10 may be for example, a reduced instruction set computer (RISC), such as an IBM POWER Processor, or a complex instruction set computer (CISC). System bus 12 operates in accordance with a standard bus protocol, such as the ISA protocol, compatible with CPU 10.

CPU 10 operates in conjunction with read-only memory (ROM) 16 and random access memory (RAM) 14. Among other things, ROM 16 supports the basic input output system (BIOS). RAM 14 includes for example, DRAM (Dynamic Random Access Memory) system memory and SRAM (Static Random Access Memory) external cache.

I/O Adapter 18 allows for an interconnection between the devices on system bus 12 and external peripherals, such as mass storage devices (e.g., a hard drive, floppy drive or CD/ROM drive), or a printer. A peripheral device 20 is for example, coupled to a peripheral control interface (PCI) bus, and I/O adapter 18 therefore may be for example a PCI bus bridge.

User interface adapter 22 couples various user input devices, such as keyboard 24, mouse 26, touchpad 32 or speaker 28 to the processing devices on bus 12.

Display adapter 36 supports a display 38 which may be for example a cathode ray tube (CRT), liquid crystal display (LCD) or similar conventional display unit. Display adapter 36 may include among other things a conventional display controller and frame buffer memory.

System 100 can be selectively coupled to a computer or telecommunications network through communications adapter 34. Communications adapter 34 may include for example, a modem for connection to a telecommunications network 20 and/or hardware and software for connecting to a computer network such as a local area network (LAN) or wide area network (WAN).

Figure 2A:
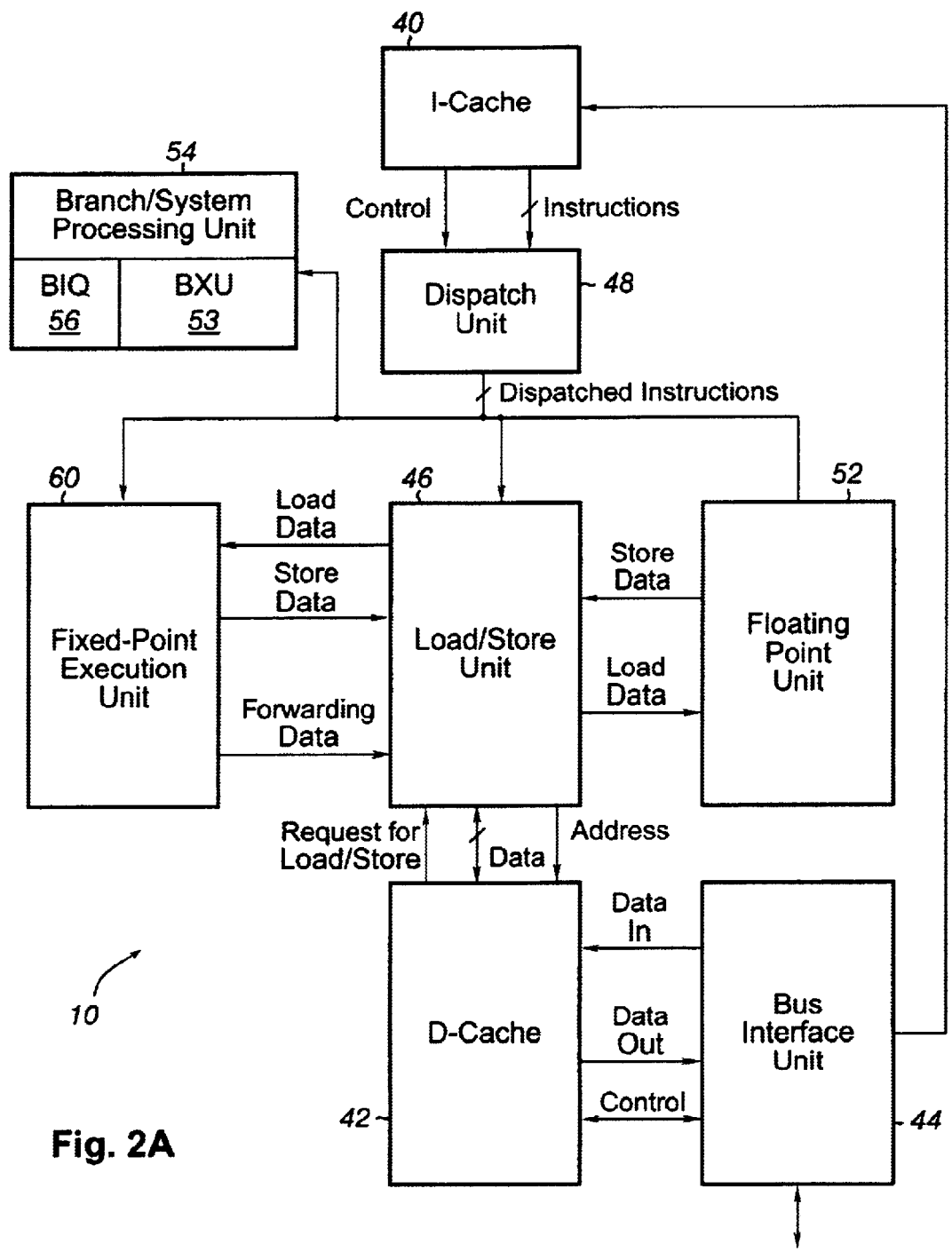
FIG. 2A is a high level functional block diagram of selected operational blocks within CPU.
Figure 2B:
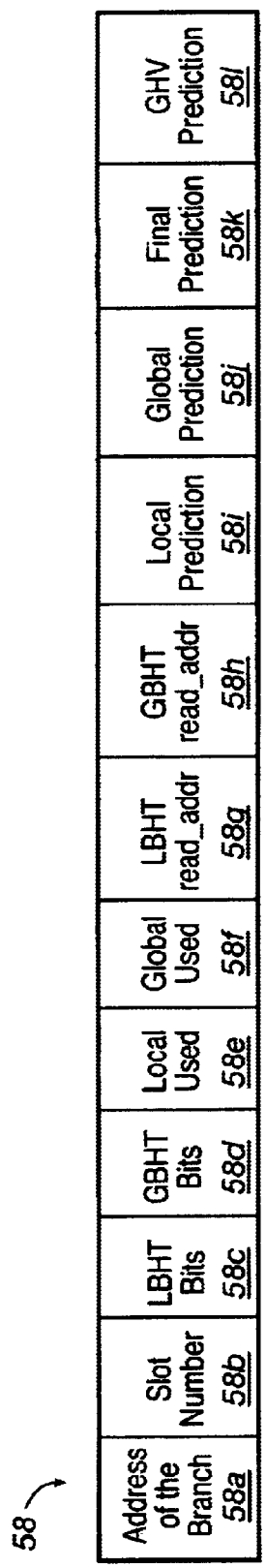
FIG. 2B illustrates an entry in a branch information queue in accordance with an embodiment of the present invention.

FIG. 2A is a high level functional block diagram of selected operational blocks within CPU 10. In the illustrated embodiment, CPU 10 includes internal instruction cache (I-cache) 40 and data cache (D-cache) 42 which are accessible through bus 12 and bus interface unit 44 and load/store unit 46. In the depicted architecture, CPU 10 operates on data in response to instructions retrieved from I-cache 40 through instruction dispatch unit 48. In response to dispatch instructions, data retrieved from D-cache 42 by load/store unit 46 can be operated upon using either fixed point execution unit 60 or floating point execution unit 52. Instruction branching is controlled by branch/system processing unit 54. Branch processing unit 54 includes a branch information queue (BIQ) 56 and a branch execution unit 53 which executes branch instructions. BIQ 56 contains a plurality of entries 58, an exemplary one of which is shown in FIG. 2B. Each entry 58 includes a plurality of fields. Field 58a holds a branch instruction address, field 58b holds a value, the "slot number," which indicates the position of the corresponding branch in a fetch group (FG), the set of instructions fetched in a single cycle, and fields 58c and 58d each contain a plurality of bits from local and global branch history tables, respectively. Fields 58e and 58f hold values flagging whether the local or global prediction was used, respectively. Read pointers into the local and global history tables are contained in a corresponding one of field 58g and 58h. Local, global and final predictions are held in fields 58i, 58j and 58k, respectively. Field 58l holds a global history vector (GHV) value. Each of the values in fields 58a–58l will be described further below, in conjunction with FIGS. 3–10.

Figure 3:
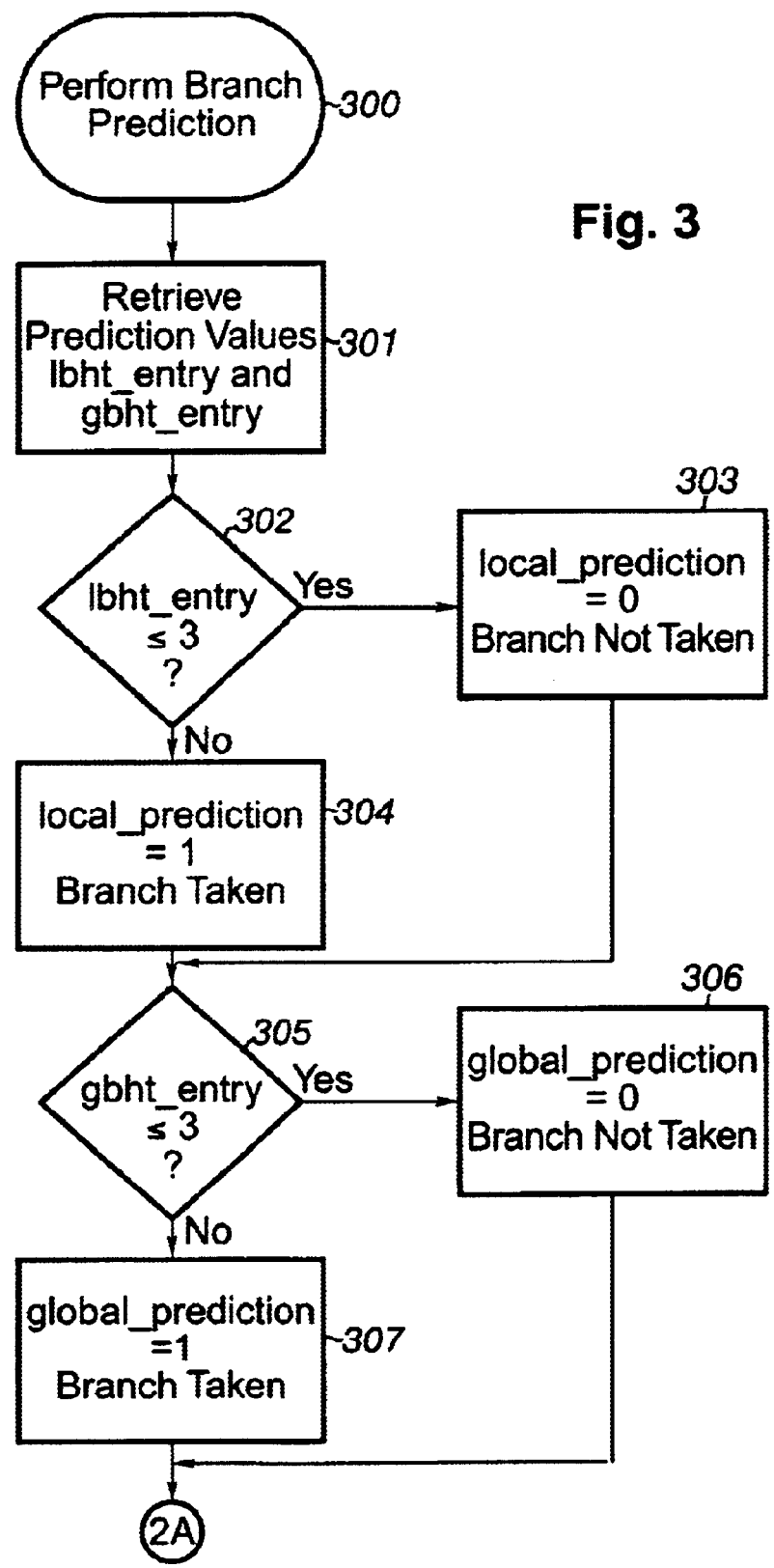
FIG. 3 is a flow diagram illustrating a method of performing branch predictions in a processing system such as those illustrated above.

FIG. 3 is a flow diagram illustrating a method 300 of performing branch predictions in a processing system such as that illustrated above. These principles utilize a local branch history table (LBHT) which preferably is a bimodal branch history table which is accessed in the bimodal manner by using a selected number of bits taken directly from a corresponding branch instruction address. A second, global branch history table (GBHT), which is accessed in accordance with the conventional Gshare technique, is also used. In the present flow diagrams, an entry in the local branch history table will be labeled lbht_entry and an entry from the global branch history table will be labeled gbht_entry. In the illustrated embodiment, each entry can be represented as the value in a modulo 8 counter, which counts from 0 to 7 and then wraps around. Furthermore, an artisan of ordinary skill would also understand that any two branch prediction mechanisms, not only local branch prediction and global branch prediction as described herein, may be combined using the principles of the present invention, and such embodiments would be within the spirit and scope of the present invention.

At Step 301, prediction values between 0 and 7 are returned from the local and global branch history table entries lbht_entry and gbht_entry respectively. If at Step 302 the value of the local table entry is less than or equal to 3, then the local prediction flag local_prediction is set to 0, indicating that the branch, in the corresponding branch instruction, is provisionally not taken for execution at fetch time. That is, the branch is predicted not-taken if only the local branch prediction is used. Otherwise, if the prediction value accessed from the local table is greater than or equal to 3, then the flag local_prediction is set to 1 and the branch is provisionally taken for execution at Step 304.

At Step 305, a similar test is preformed with regards to the prediction value retrieved from the global branch history table. Here, if the retrieved prediction value is less than or equal to 3, then the global prediction flag global_prediction is set to 0, indicating that the branch is provisionally not taken at Step 306. Otherwise, at Step 307, the flag global_prediction is set to 1 and the branch will provisionally taken at fetch time. That is, the branch is predicted taken if only the global branch prediction is used.

At Step 308, the flags local_used 58e and global_used 58f are cleared to a logical false state (i.e., =0). Then, at Step 309, the prediction value retrieved from the branch history local table is tested to determine whether it is greater than or equal to 6 or less than or equal to 1. If either of these two conditions exists, the final prediction is taken to be the local prediction in Step 310. In this case, the flag local_used is set to true at Step 311. The local_used and global_used flag will be used, following a determination of the actual outcome of the branch resolution, during the global branch history table update methods discussed below.

If both the conditions set out at Step 309 are not met, at Step 312 a determination is made as to whether the prediction value retrieved from the global branch history table is greater than or equal to 6 or less than or equal to 1. If either of these conditions is met, then the final prediction on branching is taken to be the global prediction at Step 313 in accordance with the results at Step 305. At Step 314, the flag global_used is set to true.

If none of the conditions set out in Steps 309 or 312 are met, then a series of additional tests are performed. Specifically, at Step 315 a determination is made as to whether the global branch history table value is equal to 5 and the local branch history table value is not equal to 2. If these conditions are met, then at Step 316, final_prediction is set to 1 and the branch is taken. Similar determinations are made at Step 317 to determine whether the global branch history table value is not equal to 2 and if the local branch history table value is equal to 5. If these statements are true, then the predicted operation is branch taken at Step 318, otherwise an additional test is made at Step 319. Here, the test is made to determine if both the values taken from the global and local branch history tables are equal to 4. If these conditions are met, then final_prediction is set to 1 and the branch taken at Step 320. Otherwise, at Step 321, final_prediction is set to 0 and the branch is not taken.

Processing then moves on at Step 322 to the task of updating the global and/or global branch history tables following branch resolution. The principles of the present invention provide for updating the branch history tables using any of at least three different methods, as discussed herein. For each method, the actual outcome is determined on resolution of the branch instruction. The actual outcome may be tagged using a flag, actual_outcome, having a first predetermined value if the branch is taken and a second predetermined value if the branch is not taken.

Figure 4:
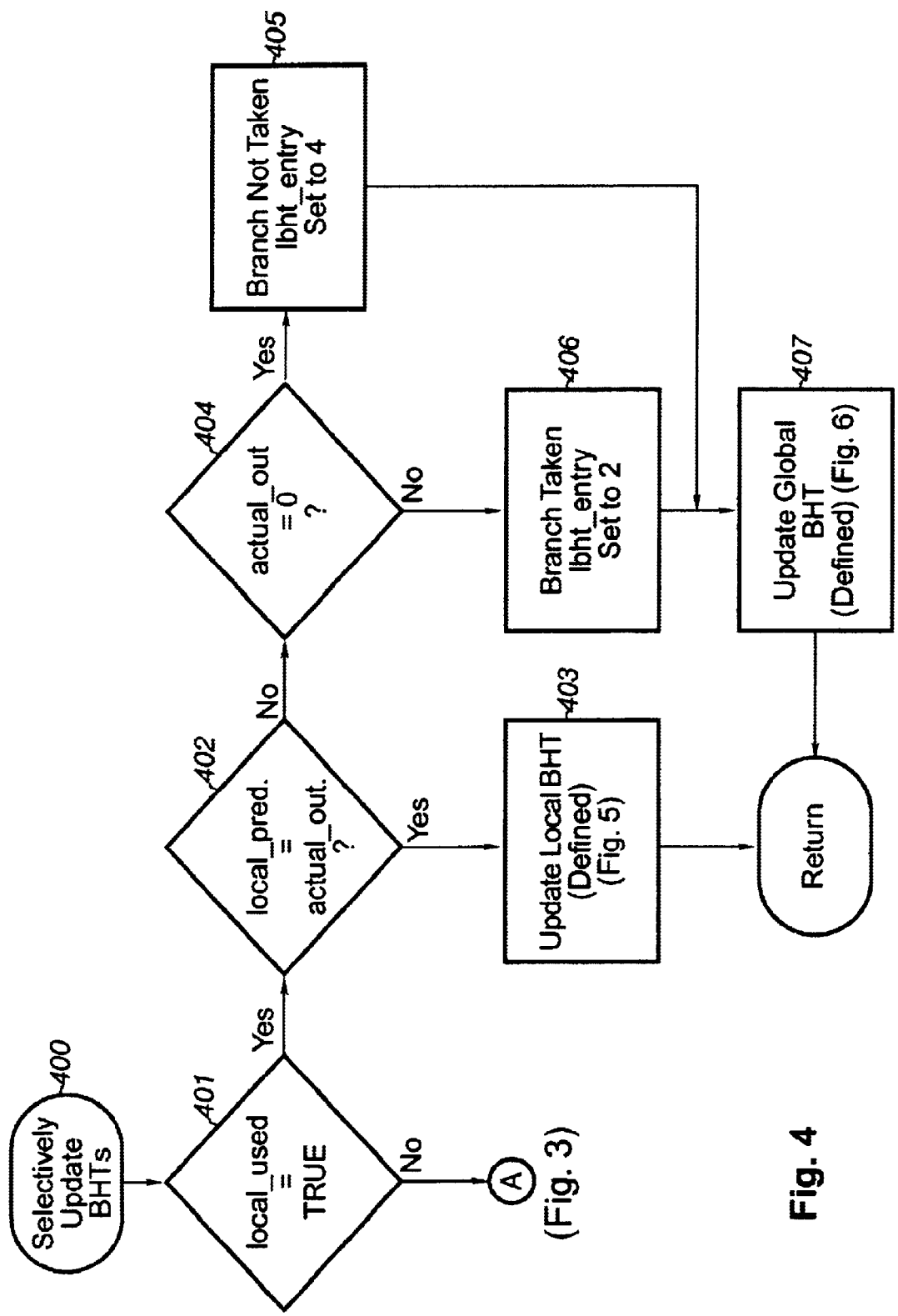
FIG. 4 illustrates the first method of updating the prediction values in the global and local branch history tables.

The first method 400 of updating the prediction values in the global and local branch history tables is illustrated in FIG. 4. Note that method 400 for updating the branch history tables may be performed asynchronously with the branch prediction methodology 300. In this regard, the values of local prediction, global prediction, etc., refer to branch instructions that have been executed, and execution of a particular branch instruction may lag the fetch of that branch by several tens of processor clock cycles. In an embodiment of the present invention, these values may be stored in the BIQ, such as BIQ 56, FIG. 2A. This will be discussed further in conjunction with FIG. 9, below. First, at Step 401, a check is made of the state of the flag local_used. Assume first, that this flag was found to be in a true state, meaning that the branch prediction was made as a function of the prediction value retrieved from the local branch history table. At Step 402, a determination is made as to whether the local prediction for the branch instruction was correct or incorrect. Specifically, if the local prediction was the same as the actual outcome which may be determined using the flag actual_outcome, then the local branch history table is updated at Step 403, in accordance with the procedure discussed below with regards to FIG. 5. If the local prediction did not reflect the actual outcome, then a test is made to determine if the actual outcome was a branch not taken (i.e., actual_outcome=0) or if the actual outcome was a branch was taken (i.e., actual_outcome=1) in Step 404. If the actual outcome was that the branch was not taken, then at Step 405, the accessed (current) local branch history table entry is set to 4 for update. Otherwise, if the branch was taken, the current local branch history table entry is set to 2 at Step 406. In each case, the global history table is updated in Step 407 in accordance with the procedure discussed further below in conjunction with FIG. 6. After that, the processing returns to wait for the next branch prediction operation.

Next, consider the case where at Step 401 it is determined that the local prediction was not used. Further, assume that the global_used flag indicates at Step 408 that the branch prediction was made with regards to the value retrieved from the global branch history table. Therefore, at Step 409, a determination is made as to whether the global prediction value reflected the actual use or nonuse of the branch instruction. In the case that the prediction made from the global table information correctly reflected the actual outcome, then at Step 410 the global branch history table is updated using the procedure discussed below in conjunction with FIG. 6. Otherwise, if the global prediction did not reflect the actual outcome, at Step 411 a determination is made as to whether the actual outcome was a branch taken (i.e. actual_outcome≠0) or branch not taken (i.e., actual_outcome=0). If the actual outcome was a branch not taken, then the current global branch history table entry is set to 4 at Step 412, otherwise, if the actual outcome was a branch taken, that entry is set to 2 at Step 413. After both Steps 412 and 413, the current local branch history table entry is updated in accordance with the procedure of FIG. 5, at Step 414. Processing then returns to waiting for the next branch prediction to take place.

Figure 6:
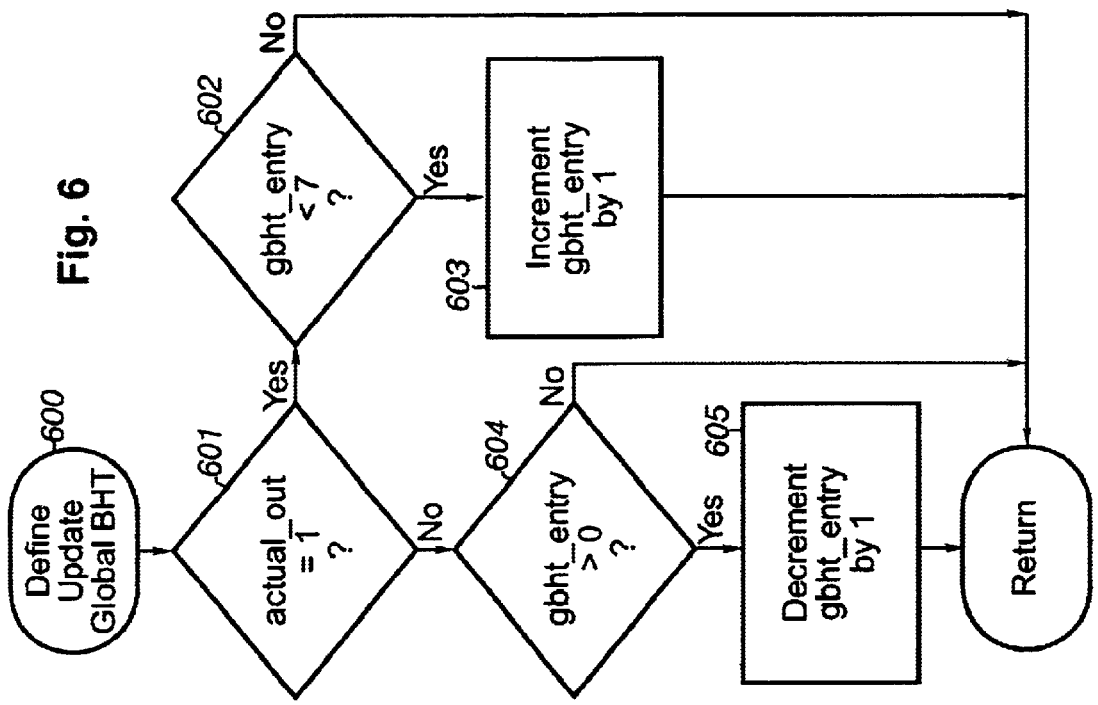
FIG. 6 depicts a method for updating the global branch history table.
Figure 5:
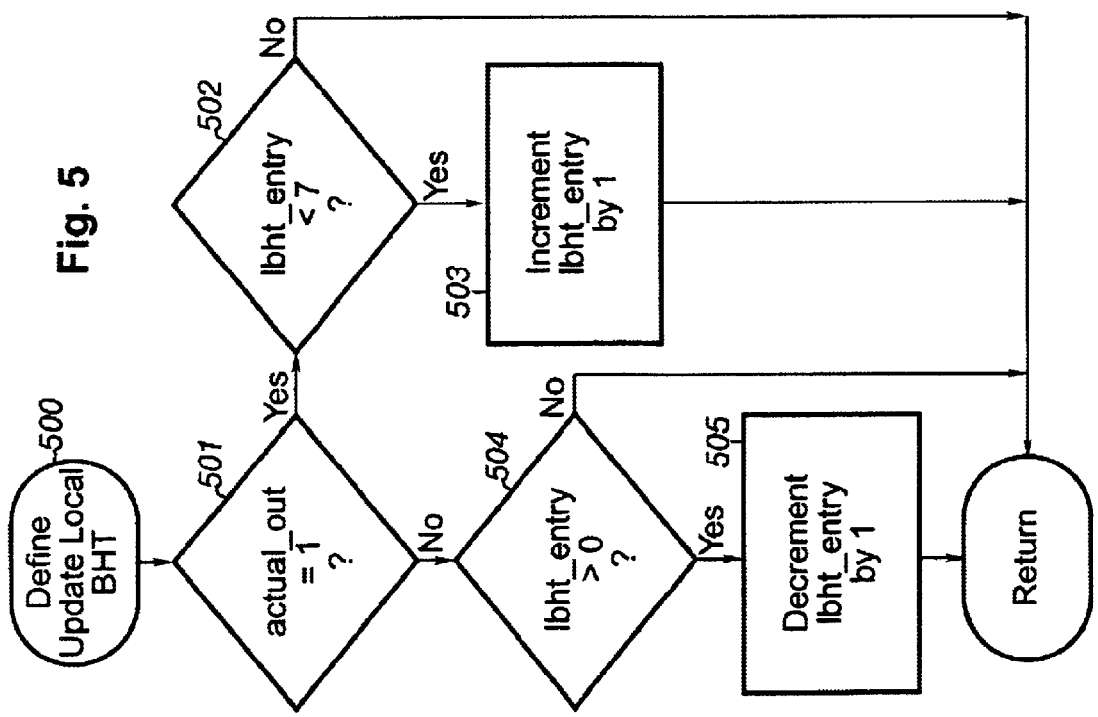
FIG. 5 depicts a method for updating the local branch history table

When neither of the global_used or local_used flags have been set, then at Step 408 the procedure proceeds to Step 415 where the local branch history table is updated in accordance with the procedure of FIG. 5 and then at Step 416, the global branch history table is updated in accordance with the procedure of FIG. 6.

A method 500 is shown in FIG. 5 for updating the local branch history table. Step 501 is a test mode to determine if the actual outcome was a branch taken (i.e., actual_outcome=1). Consider first the case where this condition is true. At Step 502, the local branch history table prediction value is tested to see if it is less than 7. If the table entry is less than 7, then at Step 503, that value is incremented by 1. Otherwise, the value remains at 7. (Recall that in the preferred embodiment, the table entries are represented by modulo 8 counters, and therefore an incrementation by 1 of a count of 7 would result in the entry becoming a 0, which would erroneously change the prediction value.)

Now, consider the case where the actual outcome was found at decision point 501 to be a branch not taken. In this case, a test is performed at Step 504 to determine if the local branch history table entry is greater than 0. If the condition at Step 504 is true then at Step 505 the local branch history table entry is decremented by 1. Otherwise, if the entry value is equal to 0, that value is maintained, since a decrementaion would result in a prediction value of 7, which also would lead to erroneous predictions.

At the end of procedure 500, the processing continues on with the selected table update method, and ultimately a return to the prediction path.

A similar method is disclosed in FIG. 6 for updating the global branch history table. At Step 601, a determination is made as to whether the actual outcome was a branch taken condition (i.e., actual_outcome=1). If the outcome was that the branch was taken, then at Step 602 a check is made to determine if the current global branch history table is less than 7. If the value is less than 7, then, in Step 603, that value is incremented by 1 to generate the new value for the entry in the global branch history table and if the value is equal to 7, the value is maintained at 7, for the same reasons described above for the case of the local branch history table update.

In the case where the actual outcome was a branch not taken (i.e. actual_outcome ≠1), then at Step 604, the value of the currently accessed global branch history table entry is checked. If the entry value is greater than 0, then at Step 605, that entry is updated by a decrement by 1, otherwise if the value equals 0, the 0 value is maintained.

At the completion of procedure 600, the processing continues with the selected update path, and ultimately returned to the branch prediction path for processing the next branch instruction.

Figure 7:
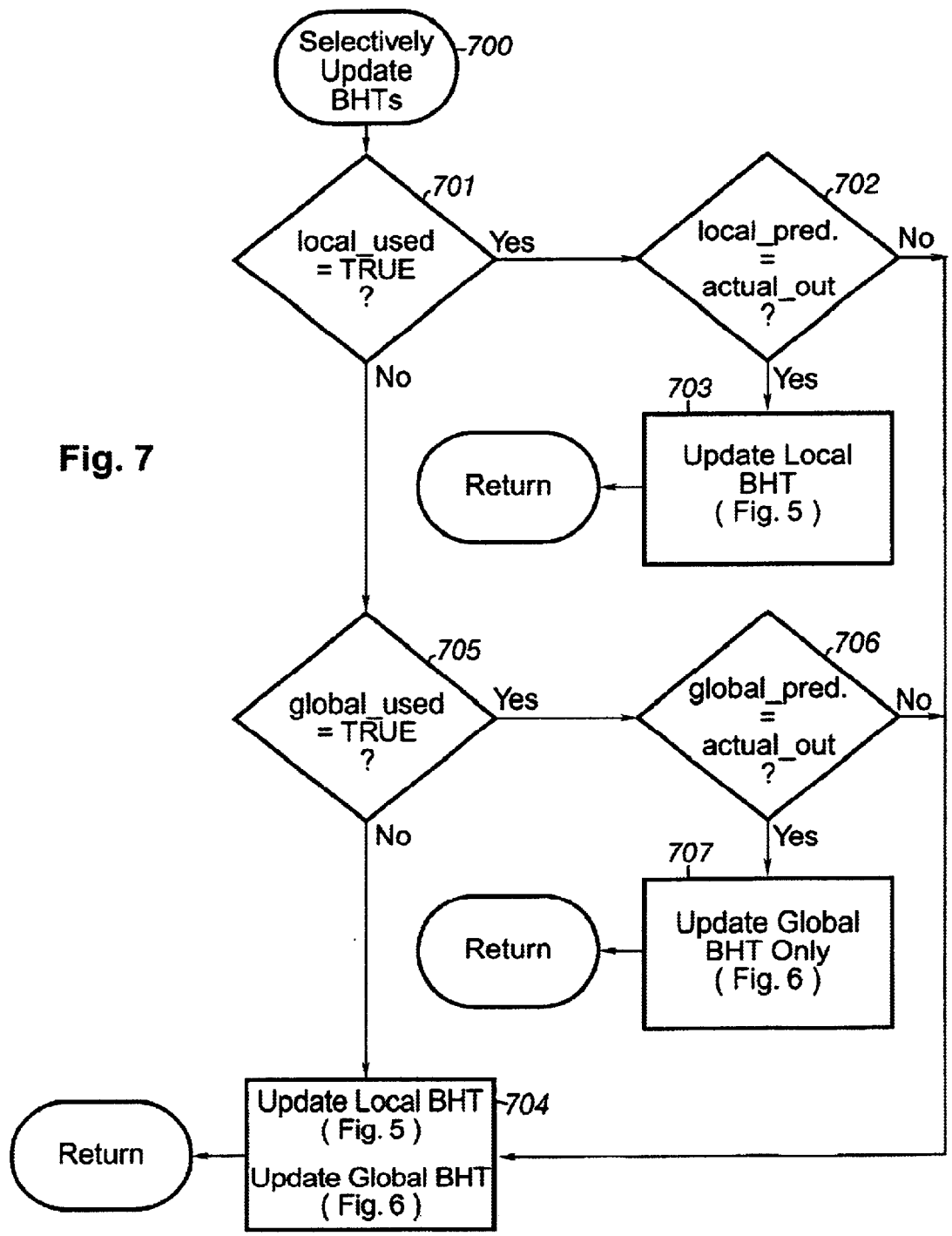
FIG. 7 depicts a second procedure for updating the local and branch history tables according to the principles of the present invention.

FIG. 7 depicts a second, alternative, procedure 700 for updating the local and global branch history tables according to the principles of the present invention. In this case, the procedure starts at Step 701 where a test is made determining whether the flag local_used has been set. In the case where the flag has been set (i.e., is true) then at Step 702 a determination is made as to whether the local prediction reflected the actual outcome of the branch execution. If this is in fact the case, then the local branch history table is updated at Step 703 using procedure 500 (FIG. 5). If the local prediction does not reflect the actual outcome, then at Step 704, the local branch history table is updated in accordance with procedure 500 and the global branch history table is updated using procedure 600 (FIG. 6).

If at Step 701 it is determined that the local prediction value was not used, then at Step 705, a determination is made as to whether the value from the global prediction table was used. Assuming that this was the case, then at Step 706 a determination is made to determine whether the global prediction reflected the actual outcome with regards to execution of the branch instruction. If this condition is true, then the current global branch history table entry is updated using procedure 600 at Step 707. If the global prediction and the actual outcome do not correspond, then both the local and global branch history tables are updated at block 704 using procedure 500 and 600 respectively.

Figure 8:
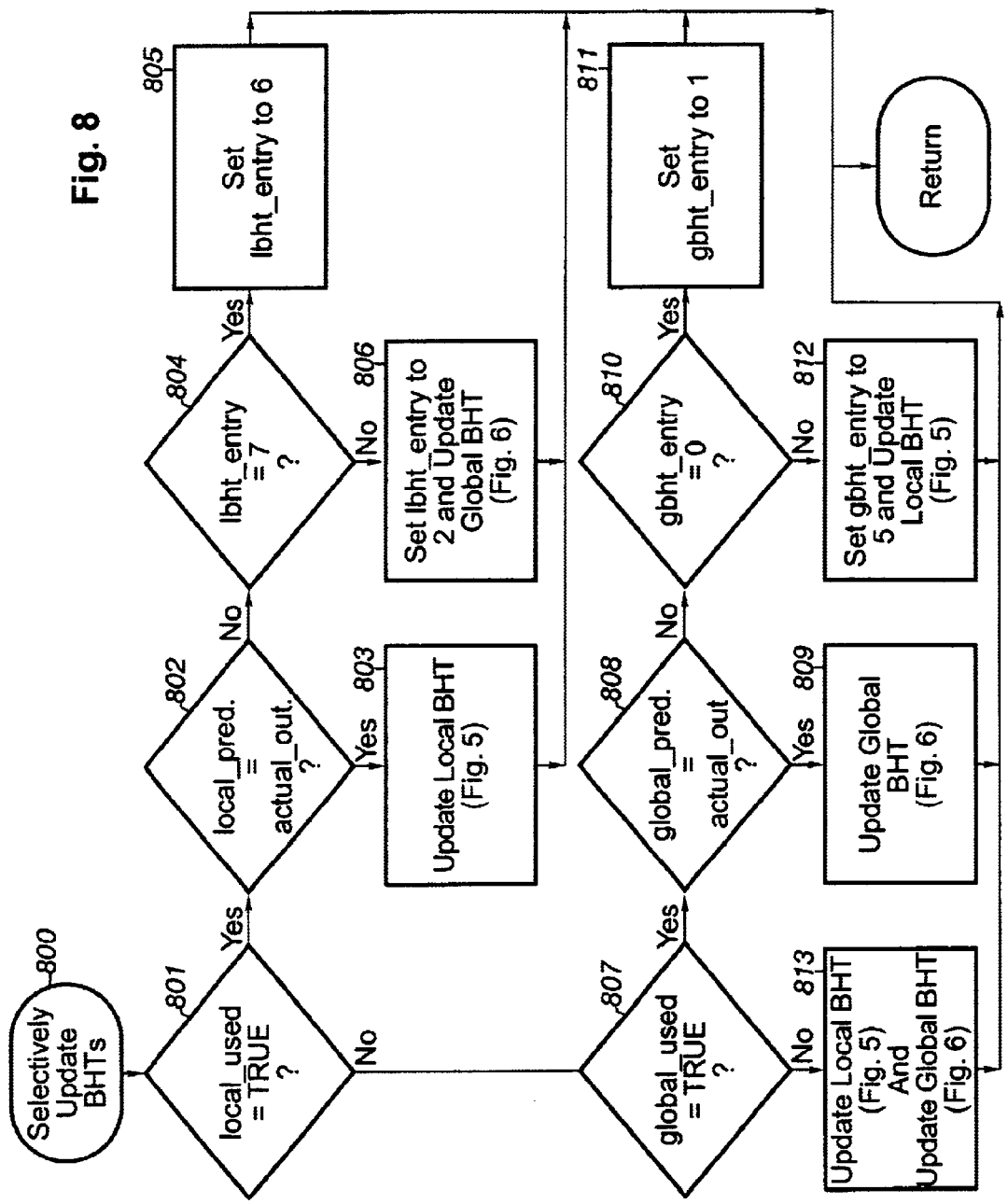
FIG. 8 illustrates a third procedure for updating the branch history tables according to the principles of the present invention.

FIG. 8 illustrates another alternative procedure 800 for updating the global branch history tables according to the principles of the present invention. At Step 801 a test is again made to determine the state of the local_used flag. If this flag is set, then at Step 802 a determination is made as to whether the local prediction corresponds to the actual outcome. If this condition is true, then the local branch history table is updated using procedure 500 at Step 803, otherwise a further test is performed at Step 804. Specifically, the test is whether the current local branch history table entry is equal to 7, and if it is, then that value is replaced in the local branch history table by a 6 at Step 805. On the other hand, if the local branch history table value is not equal to 7, then that value is replaced with a 2 and the global bit history table is updated using procedure 600 at Step 806.

Assume next that the local_used flag was not set at Step 801, a corresponding test is made for the global_used flag at Step 807. First, consider the case where the global_used flag is set. At Step 808, the test is made to determine whether the global prediction reflected the actual outcome. If the determination is positive, then at Step 809, an update of the global branch history table using procedure 600, otherwise an additional test is performed at Step 810. Here, a check is made to determine if the value from the current global branch history table entry is equal to 0. If the result of this test is positive, then that entry value is incremented by 1 at Step 811, otherwise, in Step 812, that value is replaced with a 5 and the local branch history table is updated using procedure 500.

If neither the local_used nor the global_used flags are set to true, at Step 813, then both the local branch history table and the global branch history table current entries are updated using procedure 500 and 600 respectively.

At the end of procedure 800, processing returns to the prediction branch to wait the start of the next prediction operation.

Figure 9A:
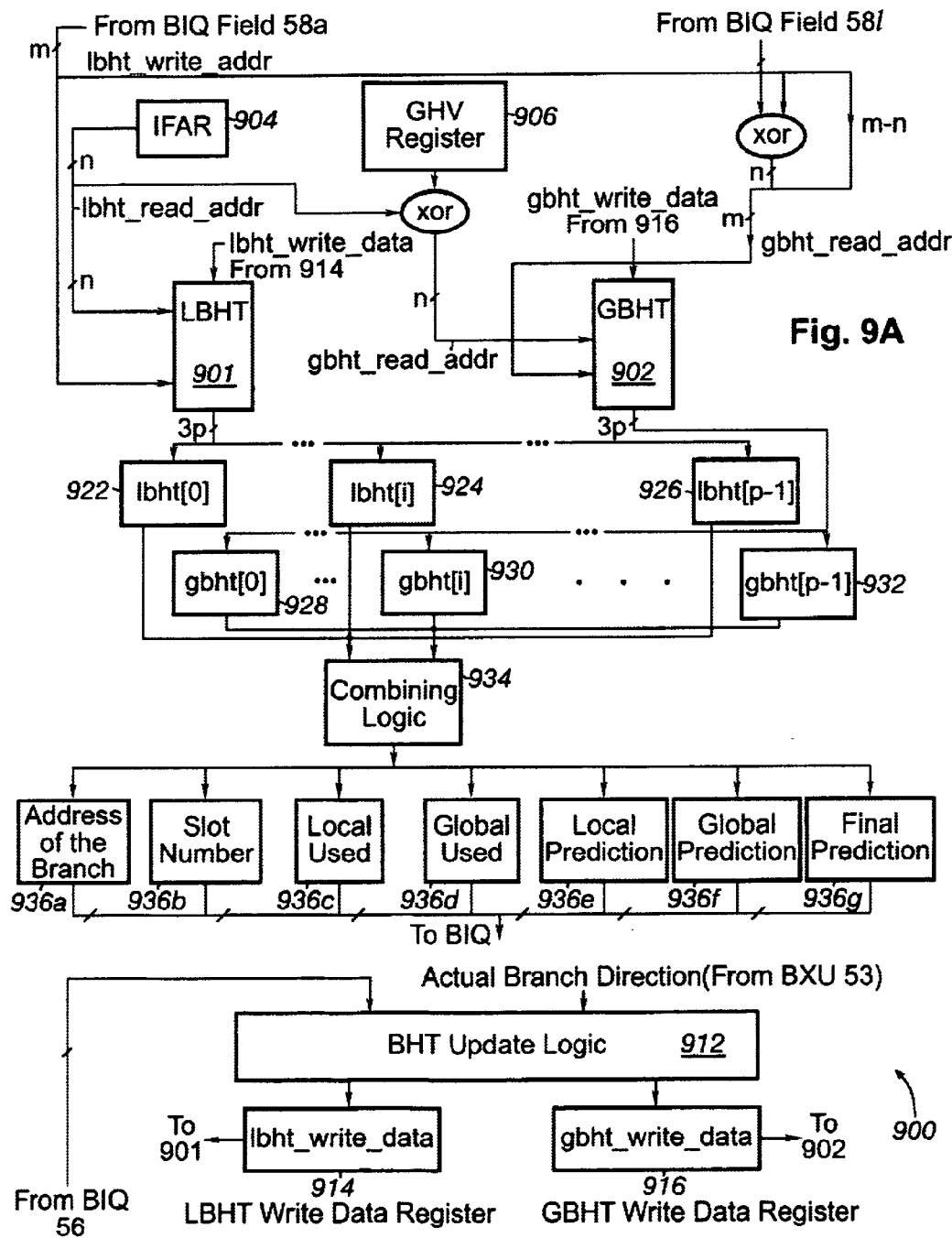
FIGS. 9A and 9B illustrate, in block diagram form, a branch prediction apparatus in accordance with an embodiment of the present invention.

FIG. 9A is a diagram illustrating a branch prediction apparatus 900 in accordance with a preferred embodiment of the present inventive concepts. Apparatus 900 may be incorporated in branch unit 54, FIG. 2. According to these concepts, two tables are used for branch prediction, namely, a local branch history table (LBHT) 901, and a global fetch-based branch history table (GBHT) 902. In the illustrated embodiment, each table 901–902 is composed of a preselected number, n, of entries each of which includes a number, p, of three-bit counters. For purposes of the present discussion, when a given one of the counters in the local or fetch-based branch history tables is set to a Logic 1, that counter (entry) will be considered as being set to a taken branch prediction value. Consequently, in this configuration, a counter (entry) storing a Logic 0 will be considered as storing a branch not-taken-prediction bit. It should be noted however, that in alternate embodiments, the reverse logic may be used without deviating from the inventive concepts.

Local branch history table 901 is accessed for obtaining branch predictions using a pointer constituting n bits taken from the current cache line address, in instruction fetch address register (IFAR) 904 in a conventional fashion. The value of this pointer will be denoted "lbht_read addr." Fetch-based branch history table 902 is accessed for obtaining branch predictions in a fashion in which n number of bits taken from the current cache line address are bitwise XORed with n number of bits from GHV register 906. The value of this pointer will be denoted "gbht_read_addr." The process for accessing the history tables has previously been described in detail in conjunction with FIG. 3.

Up to p instructions are fetched from memory, including internal memory, such as I-cache 40, FIG. 2, in one cycle of CPU 10. Thus, the number of predictions in an entry accommodates all of the instructions that are fetched in a single cycle, which may be referred to as a fetch group (FG). The number, p, of instructions in a fetch group may be eight in an embodiment of the present invention. LBHT 901 and GBHT 902 are illustrated in further detail in FIG. 9B.

The p values of the three-bit counters at the entry pointed to by lbht_read_addr in LBHT 901 are loaded in corresponding ones of the p registers 922–926. Similarly, the p values of the three-bit counters pointed to by gbht_read_addr in GBHT 902 are held in the corresponding one of the p registers 928–932. The values held in registers 922–926 and 928–932 are input to combining logic 934.

Combining logic 934 generates the local_used flag, the global_used flag, the local_prediction, the global_prediction, and the final_prediction values in accordance with methodology 300, FIG. 3 discussed hereinabove, and further discussed in conjunction with FIG. 10 below. Each of these values is stored in a corresponding one of registers 936c–936g, and provided to BIQ 56. Additionally, combining logic 934 provides the address of the corresponding branch in the fetch group and the slot number, that is the position in the fetch group, in registers 936a and 936b also provided to BIQ 56. These values may be accessed from the BIQ upon execution of the branch instructions as described in conjunction with FIG. 10, which execution may follow the fetch of the branch by several tens of processor cycles, as described above. In an embodiment of the present invention, a fetch group may include eight slots.

The GHV from which the gbht_read_addr is generated as described above tracks the history of branch instructions as they are fetched and executed. Thus, as branches are executed and resolved, the GHV is updated, and loaded into GHV register 906. A mechanism for updating the value in GHV register 906 is described in detail in the commonly owned co-pending U.S. Patent Application entitled "Circuits, Systems and Methods for Performing Branch Predictions by Selectively Accessing Bimodal and Fetch-Based History Tables," incorporated herein by reference.

Additionally, the entries in LBHT 901 and GBHT 902 must also be updated in response to the execution of branch instructions. The entries are updated by providing information to the appropriate entry in LBHT 901 and GBHT 902 for setting or resetting, as appropriate, the p three-bit counters in the corresponding entry, depending on the prediction and the resolution, or actual outcome, of the branch. The information sent to LBHT 901 may be referred to as "lbht_write_data" and the update information provided to GBHT 902 may be referred to as "gbht_write_data." The values of lbht_write_data and gbht_write_data are generated by BHT update logic 912 and loaded, respectively, into LBHT write data register 914 and GBHT write data register 916. BHT update logic 912 generates the values of lbht_write_data and gbht_write_data in response to an actual branch direction determined when the corresponding branch instruction executes the predictions from BIQ fields 58i–k, and the local-used and global-used flags, fields 58e and 58f, in the entry 58 corresponding to the resolved branch instruction. The methodology for generating the values of lbht_write_data and gbht_write_data have been described in detail above in conjunction with FIG. 4, and further in conjunction with FIG. 10, below.

The corresponding entry in the respective one of LBHT 901 and GBHT 902 is accessed using an address generated from the branch address, field 58a, in the corresponding entry 58 in BIQ 56. The address into LBHT 901, which may be referred to as "lbht_write_addr," constitutes the m-bit branch address in field 58a. A number, n, of bits of lbht_write_addr are used to select the LBHT entry and the remaining, m–n, bits index the counters in the selected entry. Thus, $2^{(m-n)}=p$. Note that the m-bit branch address may be a portion of the full address of a branch instruction. The address for accessing GBHT 902, which may be referred to as "gbht_write_addr," is generated by XORing n bits of the branch address from BIQ field 58a with the GHV value in BIQ field 581 corresponding to the branch instruction for which the history table entries are being updated. The resulting n bit value is concatenated with the remaining m–n bits of the branch address in field 58a to form the m-bit value of gbht_write_addr. The n-bit portion addresses the entry of the GBHT and the (m–n)-bit portion indexes the counters in the entry. In an embodiment of the present invention m may be fourteen and n may be eleven. The methodology for addressing LBHT 901 and GBHT 902, and updating the entries therein have been described above in conjunction with FIG. 4, and, further, below in conjunction with FIG. 10.

Figure 9B:
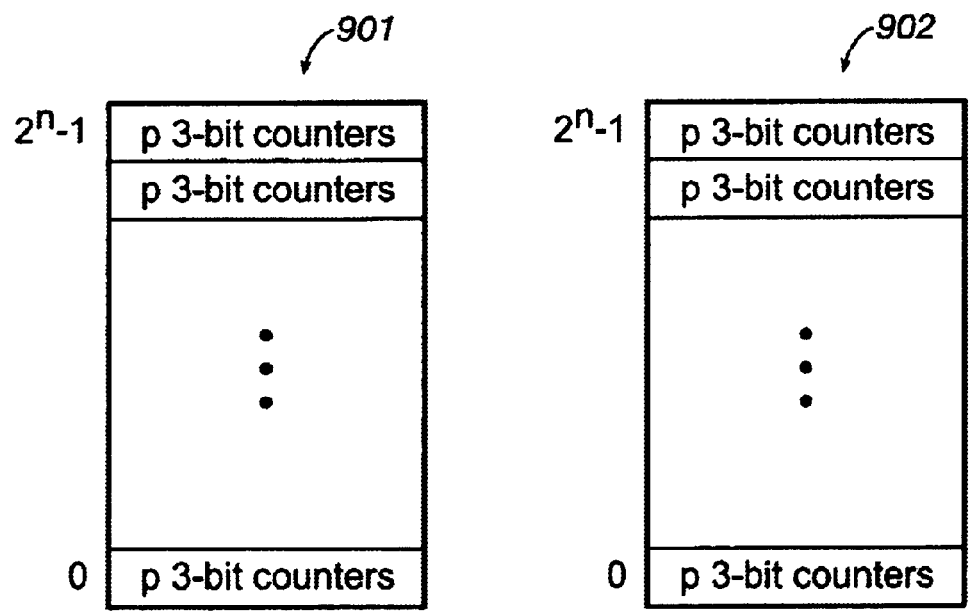
Figure 10:
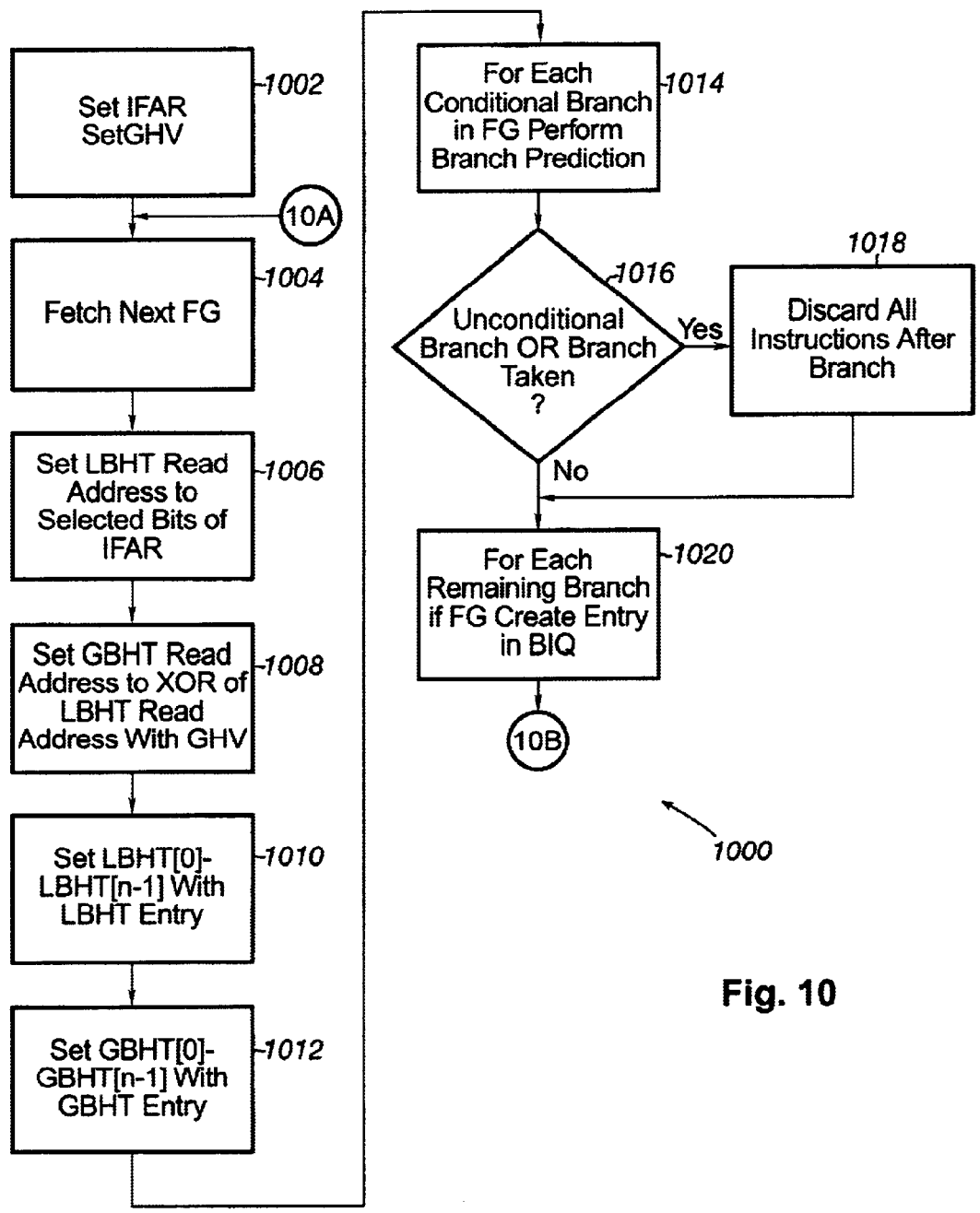
FIG. 10 illustrates, in flowchart form, a branch prediction combining methodology according to an embodiment of the present invention.
Figure 10:
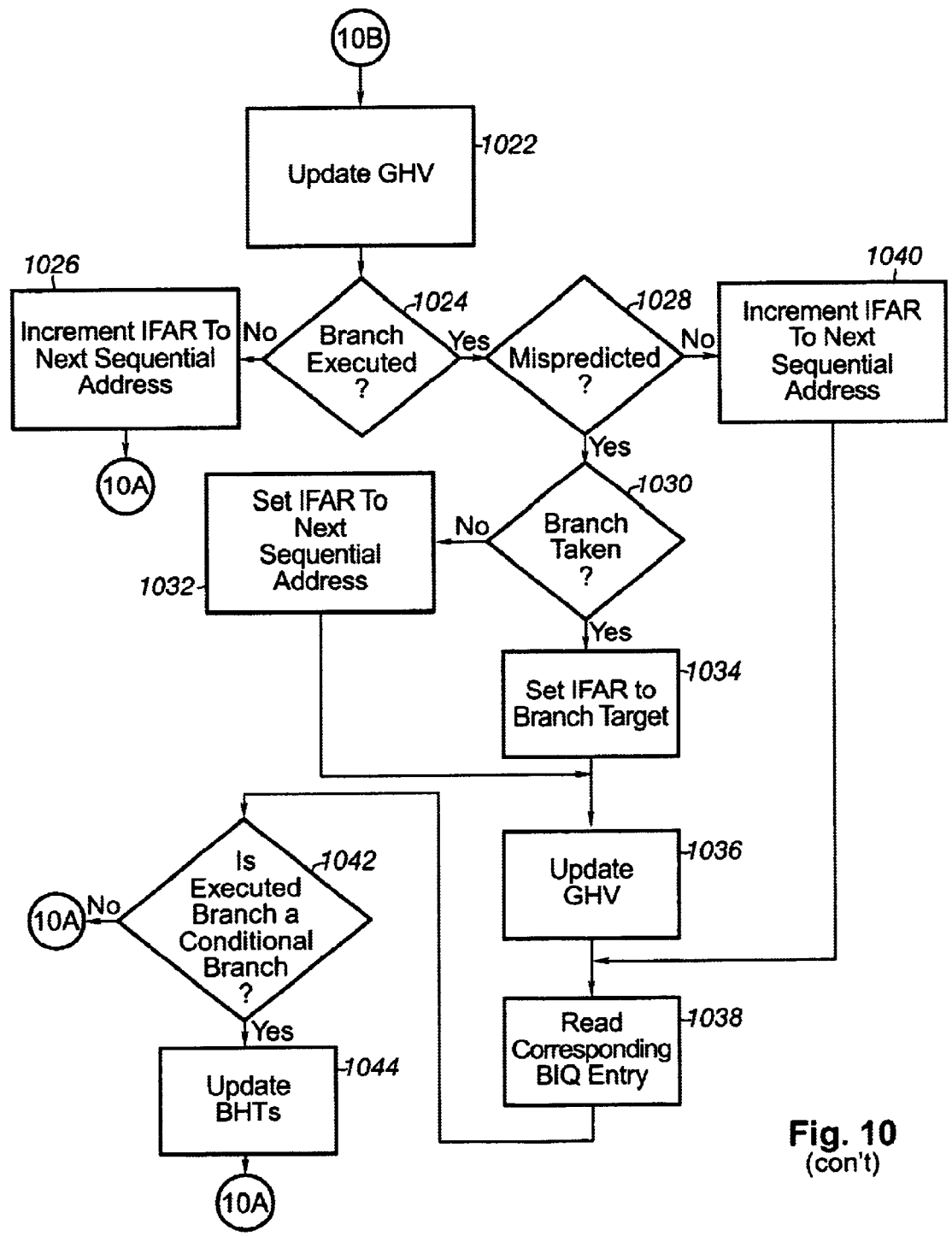

Refer now to FIG. 10 which illustrates the branch prediction combining methodology 1000 which may be performed by the apparatus of FIG. 9A. In Step 1002, the IFAR is set to the first instruction of the program being executed and the GHV is initialized. An initial value of the GHV may be all zeros in an embodiment of the present invention. In Step 1004, the next fetch group is fetched. The value of lbht_read_addr is set to a preselected number, n, bits of the IFAR, in Step 1006. In an embodiment of the present invention, n may be eleven bits. In Step 1008, the value of gbht_read_addr is set to the exclusive-or (XOR) of the value of lbht_read_addr with the GHV, as illustrated in FIG. 9A. The values in the corresponding entries of the LBHT and GBHT, for example, LBHT 901 and GBHT 902, FIG. 9, are set in corresponding registers, such as registers 922–926 and 928–932, FIG. 9, respectively, in Steps 1010 and 1012.

In Step 1014, for each conditional branch in the fetch group fetched in Step 1004, branch prediction is performed. The branch prediction may be performed in accordance with methodology 300, FIG. 3, discussed hereinabove. In Step 1016, it is determined if the fetch group includes an unconditional branch or a conditional branch predicted taken. If so, all instructions after the unconditional branch or conditional branch predicted taken are discarded, Step 1018. In Step 1020, for each remaining branch in the fetch group an entry is created in the BIQ.

In Step 1022, the GHV is updated. An apparatus and method and for updating the GHV has been described in detail in the commonly owned, co-pending U.S. Patent Application entitled "Circuits, Systems and Methods for Performing Branch Predictions by Selectively Accessing Bimodal and Fetch-Based Branch History Tables," incorporated herein by reference.

In Step 1024, it is determined if a branch instruction has been executed. If not, in Step 1026 the IFAR is incremented to the next sequential address, and methodology 1000 then returns to Step 1004. Note that, because a branch instruction may execute several tens of processor cycles after being fetched, the next sequential address may be an address that is "far" from the address of the executed branch. If, however, in Step 1024, a branch is executed in the current cycle, in Step 1028 it is determined if the branch was mispredicted. If so, in Step 1030, it is determined if the branch outcome was actually taken. If not, the IFAR is set to the next sequential address, Step 1032. If, however, a branch outcome was "taken," the IFAR is set to the branch target, Step 1034. In Step 1036 the GHV is updated, as previously described, and in Step 1038, the corresponding BIQ entry is read.

Returning to Step 1028, if the executed branch was not mispredicted, then in Step 1040, the IFAR is incremented to the next sequential address Methodology 1000 then proceeds to Step 1038, wherein the corresponding BIQ entry is read.

The values in the BIQ entry may be used for updating the branch history tables (BHT), for example LBHT 901 and GBHT 902, FIGS. 9A and 9B. However, in Step 1042, it is determined if the executed branch was a conditional branch. If the executed branch is a conditional branch, the BHTs are updated, Step 1044. The BHTs may be updated in accordance with methodology 400, FIG. 4, previously described hereinabove, and using the values read from the corresponding BIQ entry in Step 1038. Methodology 1000 then returns to Step 1004. If, in Step 1042, the executed branch is not a conditional branch, the step of updating the BHTs is bypassed, and methodology 1000 proceeds to step 1004.

Although the present invention and its advantages have been described in detail, it should be understood that various changes, substitutions and alterations can be made herein without departing from the spirit and scope of the invention as defined by the appended claims.

What is claimed is:

1. A branch prediction method comprising the steps of:
   retrieving prediction values from a local branch history table and a global branch history table;
   determining if a value retrieved from the local branch history table is less than or equal to a first predetermined value;
   provisionally predicting a branch not taken when the value from the local branch history table is less than or equal to the first predetermined value;
   provisionally predicting a branch taken when the value from the local branch history table is greater than the first predetermined value;
   determining if the value from the local branch history table is less than or equal to a second predetermined value or greater than or equal to a third predetermined value;
   in response to said step of determining if the value from the local branch history table is less than or equal to the second predetermined value or greater than or equal to the third predetermined value, selectively accepting the provisional prediction as a final prediction;
   determining if a value retrieved from the global branch history table is less than or equal to a first preselected value;
   provisionally predicting a branch not taken when the value from the global branch history table is less than or equal to the first preselected value;
   provisionally predicting a branch taken when the value from the global branch history table is greater than the first preselected value;
   in response to a determination that the value from the local branch history table is greater than the second predetermined value and less than the third predetermined value, determining if the value from the global branch history table is less than or equal to a fourth predetermined value or greater than or equal to a fifth predetermined value;
   in response to said step of determining if the value from the global branch history table is less than or equal to the fourth predetermined value or greater than or equal to the fifth predetermined value, selectively accepting the provisional global prediction as a final prediction;
   in response to a determination that the value from the global branch history table is greater than the fourth predetermined value and less than the fifth predetermined value, determining if the value from the global branch history table is equal to a sixth predetermined value and the value from the local branch history table is not equal to a seventh predetermined value; and
   in response to a determination that the value from the global branch history table is equal to the sixth predetermined value and the value from the local branch history table is not equal to the seventh predetermined value, finally predicting the branch taken.

2. The method as recited in claim 1, further comprising the steps of:
   in response to a determination that either the value from the global branch history table is not equal to the sixth predetermined value or the value from the local branch history table is equal to the seventh predetermined value, determining if the value from the global branch history table is not equal to an eighth predetermined value and the value from the local branch history table is equal to a ninth predetermined value; and
   in response to a determination that the value from the global branch history table is not equal to the eighth predetermined value and the value from the local branch history table is equal to the ninth predetermined value, finally predicting the branch taken.

3. The method as recited in claim 2, further comprising the steps of:
   in response to a determination that either the value from the global branch history table is equal to the eighth predetermined value or the value from the local branch history table is not equal to the ninth predetermined value, determining if the value from the global branch history table is equal to a tenth predetermined value and the value from the local branch history table is equal to an eleventh predetermined value; and
   in response to a determination that the value from the global branch history table is equal to the tenth predetermined value and the value from the local branch history table is equal to the eleventh predetermined value, finally predicting the branch taken.

4. The method as recited in claim 3, further comprising the step of:

in response to a determination that either the value from the global branch history table is not equal to the tenth predetermined value or the value from the local branch history table is not equal to the eleventh predetermined value, finally predicting the branch not taken.

5. The method as recited in claim 4, wherein the first predetermined value is three;

the first preselected value is three;

the second predetermined value is one;

the third predetermined value is six;

the fourth predetermined value is one;

the fifth predetermined value is six;

the sixth predetermined value is five;

the seventh predetermined value is two;

the eight predetermined value is two;

the ninth predetermined value is five;

the tenth predetermined value is four; and the eleventh predetermined value is four.

* * * * *

UNITED STATES PATENT AND TRADEMARK OFFICE
CERTIFICATE OF CORRECTION

PATENT NO.    : 6,823,446 B1
DATED         : November 23, 2004
INVENTOR(S)   : Balaram Sinharoy It is certified that error appears in the above-identified patent and that said Letters Patent is hereby corrected as shown below:

<u>Title page,</u>
Item [57], ABSTRACT,
Line 6, please replace "predicted" with -- predetermined --.

<u>Column 12,</u>
Line 21, before "provisional" please delete "the".

Signed and Sealed this

Twenty-fourth Day of May, 2005

JON W. DUDAS
*Director of the United States Patent and Trademark Office*